July 26, 1960 R. T. FIELDS 2,946,710

POLYTETRAFLUOROETHYLENE ADHESIVE TAPE

Filed March 8, 1956

INVENTOR
REUBEN T. FIELDS

BY Allan R Plumley
ATTORNEY

United States Patent Office 2,946,710
Patented July 26, 1960

2,946,710

POLYTETRAFLUOROETHYLENE ADHESIVE TAPE

Reuben Thomas Fields, Wilmington, Del., assignor to E. I. du Pont de Nemours and Company, Wilmington, Del., a corporation of Delaware Filed Mar. 8, 1956, Ser. No. 570,262
1 Claim. (Cl. 154—2.26)

This invention relates to adhesive polytetrafluoroethylene tape, and more particularly to pressure sensitive polytetrafluoroethylene tape suitable for insulation of electric conductors.

Although polytetrafluoroethylene has outstanding electrical properties such as high dielectric strength and a low power factor, the use of polytetrafluoroethylene in the form of a tape in the insulation of electrical conductors has been very limited. The highly advantageous properties of low dielectric constant, high dielectric strength, moisture repellence, and chemical inertness of polytetrafluoroethylene are combined with a non-adhesive property, which makes it very difficult to maintain a spirally-wrapped tape on an electric conductor, since no conventional adhesives will bond the polymer tape. In addition, voids and free spaces develop during the winding of the tape on a conductor, which during the operation of the conductor cause such electrical phenomena as corona discharges. These corona discharges decompose the polymer and cause failure of the insulation. The application of inert waxes, liquids or semi-liquid resins during the winding of the polytetrafluoroethylene tape on the conductor to fill out any free spaces reduces failure of polytetrafluoroethylene tape insulation but has given no permanent solution of the problem. Since these fillers are not bonded to the polymer, the layers are not held in place, the insulation is bulky and much of the advantageous high temperature resistance of polytetrafluoroethylene cannot be realized.

It is, therefore, the object of the present invention to provide a pressure-sensitive polytetrafluoroethylene tape. It is furthermore the object of the present invention to provide a polytetrafluoroethylene tape that can be used for the insulation of electrical conductors operating at high temperature Another object is to provide a polytetrafluoroethylene tape that can be spirally wrapped around conductors to result in void-free insulation adhering tightly to the conductor.

In accordance with the present invention, adhesive polytetrafluoroethylene tape is obtained by coating a surface-modified polytetrafluoroethylene tape with a thin layer of an uncured cross-linkable resin. The surface modification of the polytetrafluoroethylene tape is obtained by contacting the tape with a solution of an alkali metal in a non-metallic, inert solvent for a short period of time. This treatment results in the formation of a dark-colored coating which readily adheres to an adhesive resin and does not significantly affect the insulating properties of the polytetrafluoroethylene tape.

Figure 1:
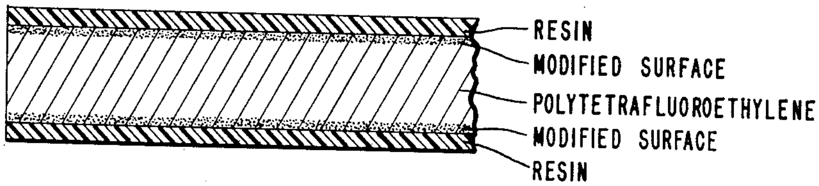
Figure 2:
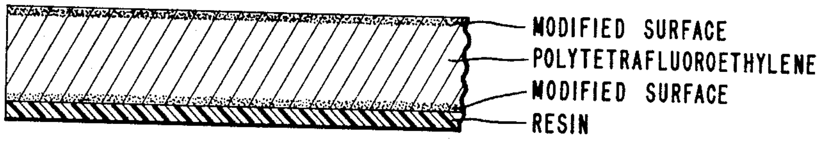
Figure 3:
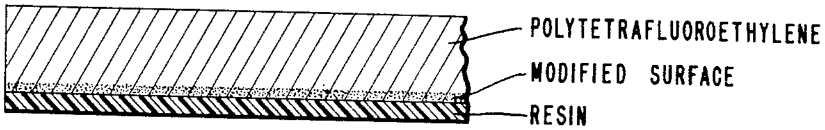

The attached drawings illustrate three modifications of the tape of the present invention in cross-sectional view. Figure 1 shows the tape with modified surfaces and the uncured thermosetting resin on both the top and bottom side. Figure 2 shows a tape having a modified surface on both top and bottom but the thermosetting resin on only one side, and Figure 3 shows a tape having the modified surface and thermosetting resin on one side only.

The unmodified tape used in the process of the present invention may be obtained by various ways known to those skilled in the art and does not constitute a part of the present invention. Thus the tape may be shaved from a solid cylinder of polytetrafluoroethylene obtained by compression molding polytetrafluoroethylene powder or may be obtained by extruding polytetrafluoroethylene in the presence of a hydrocarbon lubricant at room temperature, and then volatilizing the lubricant and sintering the polymer. Other methods include calendering polytetrafluoroethylene powder followed by sintering.

The modified polytetrafluoroethylene surface employed in the present invention is obtained as the result of a reaction between the polytetrafluoroethylene and a dissolved alkali metal. This reaction leads to the formation of a colored coating which makes the surface subject to adhesion without significantly affecting the electrical properties of the polymer tape. It is necessary that the metal be dissolved as such and does not exist in ionic form in solution. Solvents which will dissolve the alkali metals are strongly basic compounds such as ammonia or pyridine. Thus a preferred surface treating solution is sodium dissolved in liquid ammonia. Although the nature of the coating has not been determined, it was found that all alkali metals, and to a lesser degree, all alkaline earth metals give this particular coating when contacted with polytetrafluoroethylene where the metal is dissolved in a non-metallic solvent. The coating forms rapidly within a few seconds and may be obtained in concentrated or dilute solutions of the metal.

The polytetrafluoroethylene tape treated in this manner is washed free of any reaction products which may be attached to the tape and then preferably, although not necessarily so, treated with an oxidizing agent. The oxidizing agent removes any free carbon that is formed during the surface treatment. The presence of free carbon in the insulating tape seriously affects the electrical properties of the tape. Such carbon forms as the result of excessive reaction between the polytetrafluoroethylene and the dissolved metal. Preferred oxidizing agents are such compounds as 20% aqueous nitric acid.

The modified polytetrafluoroethylene tape is washed and dried and then coated with an uncured cross-linkable resin. A wide variety of cross-linkable resins may be employed; however, it is preferred to use such resins which can be cured through heating at a temperature which is below the crystalline melting point of polytetrafluoroethylene and which, when cured, exhibit high temperature stability. Such preferred resins are silicone rubbers, polyester resins and epoxy resins. Elastomeric and thermosetting resins in general adhere extremely well to the modified polytetrafluoroethylene surface. The uncured resin is applied to the modified polytetrafluoroethylene surface in the form of a tacky, viscous liquid by conventional means. The quantity of thermosetting resin applied can be varied over a wide range, generally a coating of .1 to .5 mil is sufficient. The thickness of the resin coating is readily controlled by the viscosity of the resin or the resin solution.

The resultant tape may be rolled up on a spool and used when required. After spirally wrapping a conductor with the tape, the insulated conductor is heated until the resin is cured. The spirally wrapped conductor, prior to curing, may also be wound into a coil, since the insulation is both adherent and resilient, and then cured to form a solidly bonded coil. The resultant insulation is well bonded and free of defects and does not require any additional support to keep the insulation in place and tightly wrapped. Depending on the adhesive resin employed, one may obtain rigid or resilient insulation.

The process of the present invention is further illustrated by the following examples:

*Example 1*

Extruded polytetrafluoroethylene tape ½" wide and 4 mils thick was fed into a vessel containing a solution of 20 grams of sodium in 2000 grams of liquid ammonia. With a hold-up time of twenty seconds in the solution a dark brown coating formed on the surfaces of the tape. The coated tape was washed in alcohol and then passed through a hot aqueous solution containing 20% nitric acid. The tape was then washed with water and dried. The dried tape was passed through a vessel containing a silicone varnish commercially available under the name of "DC 994" dissolved in toluene. The viscosity of the polymer solution employed was approximately 30 centipoises and gave rise to a .5 mil coating on the tape. The volatile solvent was evaporated and the resultant tacky tape was wound on a mandrel.

The tape was then employed to insulate a #16 gauge copper wire conductor by spirally wrapping the tape around the conductor with an approximately 75% overlap until the conductor was insulated by 4 layers of the tape. The tape adhered readily to the conductor and itself and could be wrapped tightly without slippage. The insulated conductor was then heated to 200° C. for a period of 8 hours to cure the silicone resin. A tightly wrapped well-bonded insulation was obtained. The conductor was placed under a load of 800 volts per mil for an extended period of time without failure of the insulation.

*Example II*

Polytetrafluoroethylene tape 4" wide and 4 mils thick was treated with sodium dissolved in liquid ammonia as described in Example I. The resulting tape was coated on both sides with a thin layer of a commercially available epoxy resin "Epoxyn Potting Compound E-PC-106," believed to be a polymer of bis phenol-A and epichlorohydrin. The tape was wound onto an untreated polytetrafluoroethylene cylinder. Six layers were applied. The assembly was placed into an oven at a temperature of 65 to 80° C. for a period of 12 hours. Although the six layers were well bonded and had formed a hard and rigid tube, the tape did not adhere to the unmodified polytetrafluoroethylene cylinder, which could be slipped off. The wrapped cured tape was found to resist 15,000 volts across the wall for over 10 hours.

*Example III*

Example II was repeated employing a commercial polyester resin "Vibrin X1047," believed to be a copolymer of maleic acid, ethylene glycol and styrene, as the bonding resin. The tube obtained on curing the polyester resin was subjected to 15,000 volts without failure.

The adhesive polytetrafluoroethylene tape of the present invention provides a highly suitable insulation for electrical conductors. It possesses outstanding dielectric properties. The insulation does not unravel or separate between layers. The various layers of the insulation are firmly bonded throughout and to the metallic conductor. The insulation can be made resilient or rigid through choice of a suitable elastomeric or thermosetting resin. Other advantages include the ease of application of the tape of the present invention. The tape is pressure sensitive and will adhere readily to the metallic conductor and itself before curing. Conventional wire-wrapping machines may be employed to apply the tape in the insulation of wires and cables. No additional braiding or reinforcing agents are required. It is, however, possible to employ such reinforcing agents as glass fibers if desired. Furthermore, glass fabrics coated with continuous layers of polytetrafluoroethylene may be employed to prepare the tape of the present invention. Because of its ready adherence, the tape may be manually applied.

The tape of the present invention is adapted for a wide range of uses and provides suitable insulation for conductors found in magnet coils, motors, generators, transformers, resistors, cables, heating coils, switch gears and electric control equipment. The tape may be of any width desire. The insulation withstands exceedingly high and low temperatures without electrical or mechanical failure. It may be exposed without failure to severe weather conditions, humidity and corrosive chemicals. The tape may, of course, also be used for non-electrical applications. For such purposes, it is not necessary that the polytetrafluoroethylene tape, prior to applying the adhesive, be in an impervious form. Thus, it may be in the form of fabric, or in the form of felted fibers (e.g. polytetrafluoroethylene "paper").

It is apparent that many widely different embodiments of this invention can be made without departing from the spirit and scope thereof; and, therefore, the invention is not intended to be limited except as indicated in the appended claim.

I claim:

The method of insulating an electrical conductor which comprises the steps of contacting a tape of polytetrafluoroethylene with a solution of an alkali metal in a non-metallic, inert solvent treating the tape with nitric acid, coating the tape with an uncured resin of the class consisting of silicone resins, epoxy resins and polyester resins, winding the tape onto an electrical conductor and thereafter heating the tape and conductor sufficiently to cause curing of the said resin.

References Cited in the file of this patent

UNITED STATES PATENTS

| | | |
|---|---|---|
| 2,520,173 | Sanders | Aug. 29, 1950 |
| 2,533,501 | Pendleton et al. | Dec. 12, 1950 |
| 2,728,698 | Rudner | Dec. 27, 1955 |
| 2,736,721 | Dexter | Feb. 28, 1956 |
| 2,768,925 | Fay | Oct. 30, 1956 |
| 2,789,063 | Purvis | Apr. 16, 1957 |

OTHER REFERENCES

"Teflon Tape," Du Pont Co., 1950.